(12) United States Patent
Oh et al.

(10) Patent No.: US 12,191,510 B2
(45) Date of Patent: Jan. 7, 2025

(54) RECHARGEABLE BATTERY

(71) Applicant: LG Chem, Ltd., Seoul (KR)

(72) Inventors: Sei Woon Oh, Daejeon (KR); Sung Hwan Cho, Daejeon (KR); Soo Hyun Lim, Daejeon (KR); Sun Hwak Woo, Daejeon (KR); Jinseo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 122 days.

(21) Appl. No.: 16/630,243

(22) PCT Filed: Oct. 19, 2018

(86) PCT No.: PCT/KR2018/012432
§ 371 (c)(1),
(2) Date: Jan. 10, 2020

(87) PCT Pub. No.: WO2019/083230
PCT Pub. Date: May 2, 2019

(65) Prior Publication Data
US 2021/0036272 A1 Feb. 4, 2021

(30) Foreign Application Priority Data
Oct. 23, 2017 (KR) .......................... 10-2017-0137663

(51) Int. Cl.
*H01M 50/172* (2021.01)
*H01M 50/105* (2021.01)
(Continued)

(52) U.S. Cl.
CPC ....... *H01M 50/172* (2021.01); *H01M 50/105* (2021.01); *H01M 50/533* (2021.01);
(Continued)

(58) Field of Classification Search
CPC ............. H01M 50/543; H01M 50/124; H01M 50/531; H01M 50/172; H01M 50/54;
(Continued)

(56) References Cited

U.S. PATENT DOCUMENTS 8,318,336 B2    11/2012   Kim
8,486,561 B2    7/2013    Tsukamoto et al.
(Continued)

FOREIGN PATENT DOCUMENTS

CN    102087919 A    6/2011
CN    104205464 A    12/2014
(Continued)

OTHER PUBLICATIONS

Machine translation of JP2006128038A specification (Year: 2006).*
(Continued)

*Primary Examiner* — Michael L Dignan
(74) *Attorney, Agent, or Firm* — Lerner David LLP

(57) ABSTRACT

A rechargeable battery includes an electrode assembly; a case having a sealing portion surrounding the electrode assembly; and a lead electrically connected to the electrode assembly and extending in a first direction, wherein the lead includes a first region in contact with the electrode assembly and located inside the case; a second region exposed to an outside of the case; and a third region located between the first region and the second region and overlapping the sealing portion of the case, wherein the third region has a width greater than that of the first region and the second region in a second direction and has a thickness smaller than that of the first region and the second region in a third direction, and wherein the second direction is perpendicular to the first direction, and the third direction is perpendicular to the first direction and the second direction.

15 Claims, 7 Drawing Sheets

(51) Int. Cl.
*H01M 50/533* (2021.01)
*H01M 50/543* (2021.01)
*H01M 50/55* (2021.01)
*H01M 50/557* (2021.01)

(52) U.S. Cl.
CPC ......... *H01M 50/543* (2021.01); *H01M 50/55* (2021.01); *H01M 50/557* (2021.01)

(58) Field of Classification Search
CPC ............. H01M 50/538; H01M 50/533; H01M 50/105; Y02E 60/10; Y02P 70/50
See application file for complete search history.

(56) References Cited

U.S. PATENT DOCUMENTS

| | | | |
|---|---|---|---|
| 8,619,409 | B2 | 12/2013 | Yawata et al. |
| 10,367,184 | B2 | 7/2019 | Ro |
| 2004/0126650 | A1 | 7/2004 | Kim |
| 2011/0086264 | A1* | 4/2011 | Tsukamoto ........... H01M 50/55 29/623.2 |
| 2011/0129726 | A1 | 6/2011 | Tsukamoto et al. |
| 2012/0003528 | A1 | 1/2012 | Kusukawa et al. |
| 2015/0037658 | A1 | 2/2015 | Maeda et al. |
| 2015/0372335 | A1 | 12/2015 | Jung et al. |
| 2017/0110763 | A1 | 4/2017 | Ro |
| 2019/0067671 | A1* | 2/2019 | Buckholz ............ H01M 50/178 |
| 2019/0363314 | A1* | 11/2019 | Seo .................. H01M 10/0436 |

FOREIGN PATENT DOCUMENTS

| | | | | |
|---|---|---|---|---|
| CN | 204375833 | * | 6/2015 | .............. H01M 2/26 |
| CN | 204375833 U | * | 6/2015 | |
| CN | 205376627 U | | 7/2016 | |
| CN | 212011123 U | * | 11/2020 | |
| EP | 2942832 A1 | | 11/2015 | |
| JP | 2002056839 A | | 2/2002 | |
| JP | 2005149882 A | | 6/2005 | |
| JP | 2006128038 A | | 5/2006 | |
| JP | 2006164784 A | | 6/2006 | |
| JP | 2007042628 A | | 2/2007 | |
| JP | 2008171579 A | | 7/2008 | |
| JP | 2012014952 A | | 1/2012 | |
| JP | 2012018831 A | * | 1/2012 | |
| JP | WO2010038906 A1 | | 3/2012 | |
| JP | 2012146551 A | | 8/2012 | |
| JP | 2013045602 A | | 3/2013 | |
| KR | 20040026258 A | | 3/2004 | |
| KR | 20120063236 A | | 6/2012 | |
| KR | 20170044990 A | | 4/2017 | |
| WO | 2016039503 A1 | | 3/2016 | |

OTHER PUBLICATIONS

Machine English translation of CN 204375833 (Year: 2015).*
International Search Report from Applicaton No. PCT/KR2018/012432 dated Apr. 16, 2019, 2 pages.
Search Report for Chinese Application No. CN201811176898.2 dated Nov. 29, 2019, 1 page.
Extended European Search Report including Written Opinion for Application No. EP18870996.8, dated Sep. 10, 2020, pp. 1-8.

* cited by examiner

Figure 5
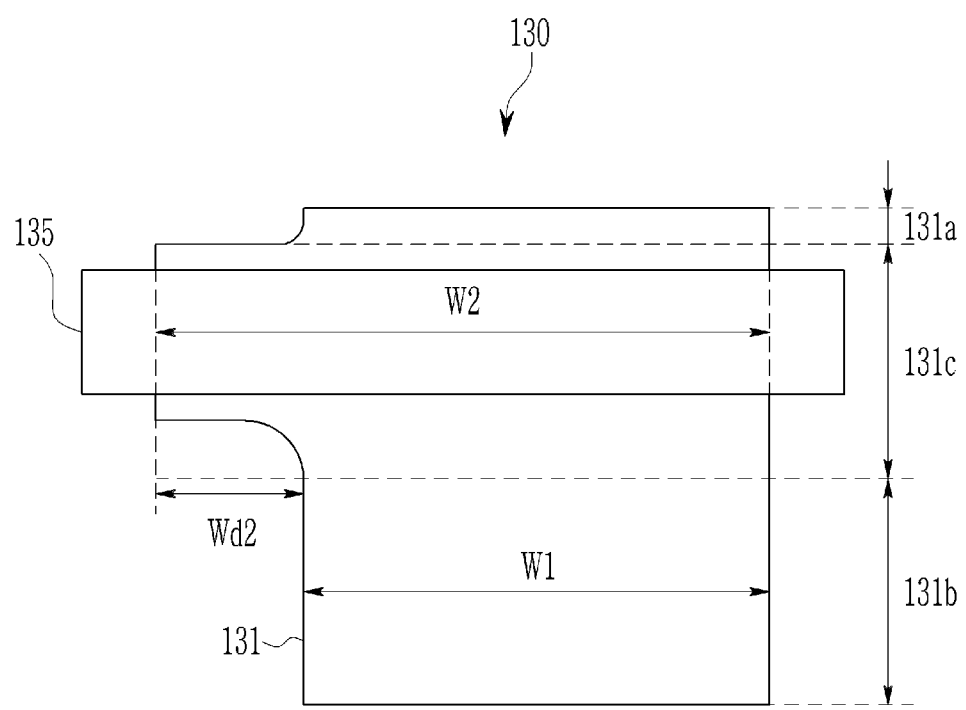
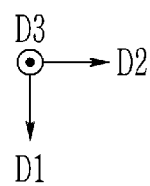

RECHARGEABLE BATTERY

CROSS-REFERENCE TO RELATED APPLICATIONS

This application is a national phase entry under 35 U.S.C. § 371 of International Application No. PCT/KR2018/012432, filed Oct. 19, 2018, published in Korean, which claims priority to and the benefit of Korean Patent Application No. 10-2017-0137663 filed in the Korean Intellectual Property Office on Oct. 23, 2017, the entire contents of all of which are incorporated herein by reference.

TECHNICAL FIELD

The present invention relates to a rechargeable battery, and more particularly, to a pouch type rechargeable battery.

BACKGROUND ART

Rechargeable batteries may be classified according to which structure an electrode assembly having a cathode/separator/anode structure has. Typically, rechargeable batteries have a winding type electrode assembly having a structure in which long sheet type cathodes and anodes are wound with a separator interposed therebetween, a stack or laminate type electrode assembly in which a plurality of cathodes and anodes cut in a predetermined size unit are sequentially laminated with a separator interposed therebetween, a stack/folding type electrode assembly having a bi-cell or a full cell wound structure in which cathodes and anodes of a predetermined unit are laminated with a separator interposed therebetween, and the like.

Recently, a pouch-type rechargeable battery having a structure in which a stack or stack/folding type electrode assembly is embedded in a pouch type case of an aluminum laminate sheet is attracting attention. The pouch type rechargeable battery has advantages of low manufacturing cost, small weight, and easy shape deformation.

DISCLOSURE

Technical Problem

In a pouch type rechargeable battery, a size of a lead connected to an electrode assembly embedded in a case and exposed to the outside of the case is limited by a size of the pouch type rechargeable battery. For example, a lead of a thin pouch type rechargeable battery may have to be thin. If the size of the lead becomes smaller, an amount of current generated through the lead becomes larger, which may cause a problem in terms of stability.

The present invention has been made in an effort to provide a pouch type rechargeable battery having advantages of reducing a resistance of a lead to reduce heat generated in the lead and to prevent a sealing failure due to the lead.

Technical Solution

An exemplary embodiment of the present invention provides a rechargeable battery includes an electrode assembly; a case comprising a sealing portion surrounding the electrode assembly; and a lead electrically connected to the electrode assembly and extending in a first direction, wherein the lead includes a first region in contact with the electrode assembly and located inside the case; a second region exposed to an outside of the case; and a third region located between the first region and the second region and overlapping the sealing portion of the case, wherein the third region has a width greater than that of the first region and the second region in a second direction and has a thickness smaller than that of the first region and the second region in a third direction, and wherein the second direction is perpendicular to the first direction, and the third direction is perpendicular to the first direction and the second direction.

A thickness of the entire third region may be smaller than thicknesses of the first region and the second region.

The third region may include a portion protruding from the first region and the second region by a first width difference toward one side of the second direction.

The third region may further include a portion protruding from the first region and the second region by a second width difference toward an opposite side of the second direction.

The first width difference and the second width difference may be the same.

The first width difference and the second width difference may be different from each other.

The third region may be formed to be thinner than the first region and the second region by a first thickness difference in one side of the third direction.

The third region may be formed to be thinner than the first region and the second region by a second thickness difference in an opposite side of the third direction.

The first thickness difference and the second thickness difference may be the same.

The first thickness difference and the second thickness difference may be different from each other.

Advantageous Effects

The resistance of the lead in the rechargeable battery may be reduced, thereby reducing the heat generated by the lead, and preventing the sealing failure due to the lead.

DESCRIPTION OF THE DRAWINGS

FIG. 5 is a plan view showing another exemplary embodiment of a plane structure of a lead.

MODE FOR INVENTION

Figure 1:
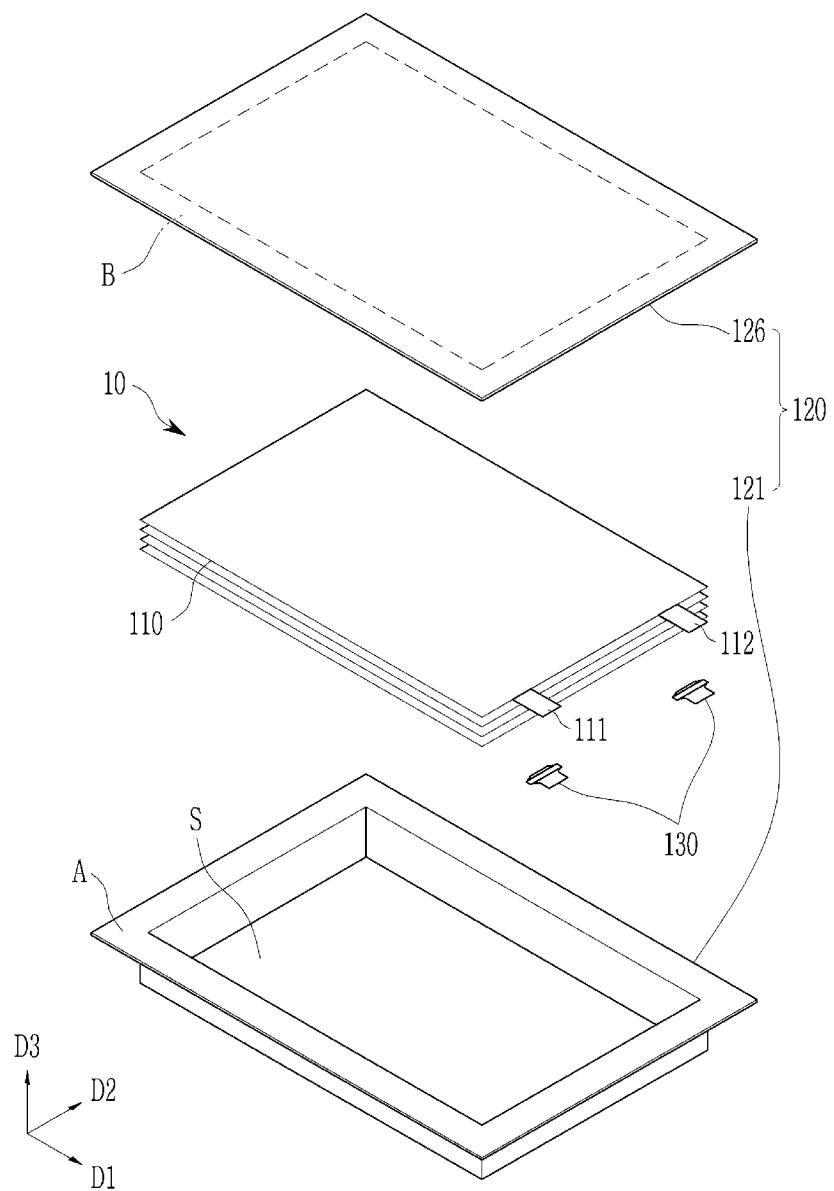
FIG. 1 is an exploded perspective view of a rechargeable battery according to an exemplary embodiment of the present invention.

Hereinafter, with reference to the accompanying drawings, the present invention will be described in detail such that those skilled in the art may easily carry out the present invention with respect to the exemplary embodiments of the present invention. The present invention may be embodied in many different forms and is not limited to the exemplary embodiments set forth herein.

In order to clearly describe the present invention, parts unrelated to the descriptions are omitted, and the same or similar elements are denoted with the same reference numerals throughout the specification.

Throughout this specification and the claims that follow, when it is described that an element is "coupled" to another element, the element may be "directly coupled" to the other element and "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a rechargeable battery according to an embodiment of the present invention will be described with reference to FIGS. 1 to 3.

FIG. 1 is an exploded perspective view of a rechargeable battery according to an exemplary embodiment of the present invention.

Referring to FIG. 1, a secondary battery 10 includes an electrode assembly 110, a plurality of electrode tabs 111 and 112 connected to the electrode assembly 110, a case 120 accommodating the electrode assembly 110, and a plurality of leads 130 connected to the plurality of electrode tabs 111 and 112.

The electrode assembly 110 is a power generation element in which a cathode and an anode are sequentially stacked with a separator interposed therebetween, and may be in a stack or stack/folding type structure. However, the structure of the electrode assembly 110 is not limited. According to an embodiment, the electrode assembly 110 may have a structure in which long sheet type cathode and anode are wound with the separator interposed therebetween.

The plurality of electrode tabs 111 and 112 may include a first electrode tab 111 extending from a cathode of the electrode assembly 110 and a second electrode tab 112 extending from an anode of the electrode assembly 110.

The case 120 may include a first case 121 and a second case 126 facing each other with the electrode assembly 110 therebetween. The first case 121 may include a storage portion S of a concave shape in which the electrode assembly 110 may be seated and a first sealing region A around the storage portion S. The second case 126 may be in a plate shape that may cover an upper surface of the electrode assembly 110 and may include a second sealing region B in contact with the first sealing region A. The first case 121 and the second case 126 may be in an aluminum laminate structure of resin layer/metal thin film layer/resin layer. Although the first case 121 includes the storage portion S and the second case 126 is formed in the plate shape in FIG. 1, the structure of the case 120 capable of accommodating the electrode assembly 110 is not limited and the case 120 may be modified into various structures.

A plurality of leads 130 are electrically connected to the first electrode tab 111 and the second electrode tab 112 and are partially exposed to the outside of the case 120 when the secondary battery 10 is completely assembled. One of the plurality of leads 130 may be welded and electrically connected to the first electrode tab 111 and the other one of the plurality of leads 130 may be welded and electrically connected to the second electrode tab 112. That is, one of the plurality of leads 130 may be a lead of a cathode and the other may be a lead of an anode.

The electrode assembly 110 may be stored in the storage portion S of the first case 121, the leads 130 are electrically connected to each of the first electrode tab 111 and the second electrode tab 112, then in a state in which the first sealing region A of the first case 121 and the second sealing region B of the second case 126 are in contact with each other, the first case 121 and the second case 126 may be bonded by applying heat and pressure to an overlapped portion of the first sealing region A and the second sealing region B and mutually fusing the resin layer, thereby completely assembling the rechargeable battery 10. A portion where the first sealing region A and the second sealing region B are bonded in the case 120 may be a sealing portion for sealing the electrode assembly 110 in the secondary battery 10. The sealing portion of the case 120 may surround the electrode assembly 110 to seal the electrode assembly 110 from the outside of the case 120.

It is shown in FIG. 1 that the first electrode tab 111 and the second electrode tab 112 extend from the electrode assembly 110 in a first direction D1 and the leads 130 connected to each of the first electrode tab 111 and the second electrode tab 112 extend in the first direction D1. However, this is not a limitation. According to an embodiment, the first electrode tab 111 and the second electrode tab 112 may extend in different directions, and the plurality of leads 130 may extend in different directions correspondingly. For example, one of the first electrode tab 111 and the second electrode tab 112 may extend in the first direction D1 and the other may extend in a second direction D2, one lead 130 may extend in the first direction D1, and the other lead 130 may extend in the second direction D2 correspondingly. The second direction D2 may be perpendicular to the first direction D1.

Also, the plurality of the first electrode tabs 111 and the plurality of the second electrode tabs 112 may be provided, and the number of the leads 130 may be determined correspondingly.

Hereinafter, the lead 130 according to an exemplary embodiment of the present invention will be described in detail with reference to FIGS. 2 and 3.

Figure 2:
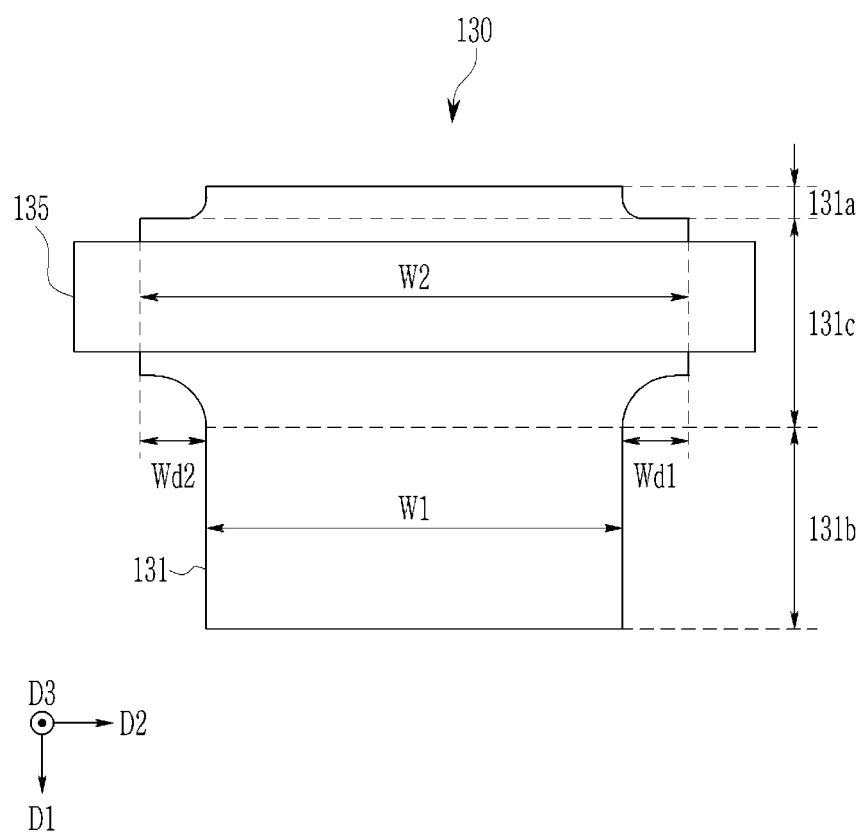
FIG. 2 is a plan view showing a lead of FIG. 1 in more detail.

FIG. 2 is a plan view showing the lead 130 of FIG. 1 in more detail. FIG. 3 is a side view showing the lead 130 of FIG. 1 in more detail.

Figure 3:
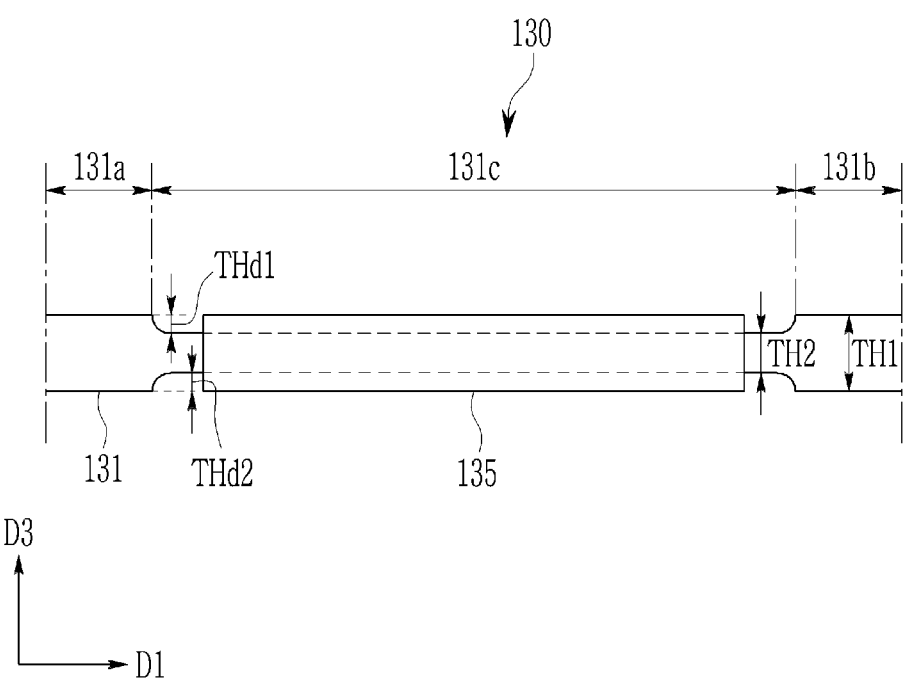
FIG. 3 is a side view showing the lead of FIG. 1 in more detail.

Referring to FIGS. 2 and 3, the lead 130 may include a conductive metal portion 131 and a film portion 135.

The conductive metal portion 131 may be formed of one conductor and may include a first region 131a, a second region 131b and a third region 131c in the first direction D1 in which the lead 130 extends. The first region 131a may be a portion in directly contact with the electrode tabs 111 and 112 and located inside the case 120. The second region 131b may be exposed to the outside of the case 120. The third region 131c may be a portion located between the first region 131a and the second region 131b and overlapping a sealing portion of the case 120.

As shown in FIG. 2, on a plane, the first region 131a and the second region 131b may have a first width W1 in the second direction D2 and the third region 131c may have a second width W2 in the second direction D2. The plane means a plane parallel to the first direction D1 and the second direction D2. The second width W2 may be larger than the first width W1. That is, the third region 131c may have a width greater than the first region 131a and the second region 131b in the second direction D2.

The third region 131c may include a portion protruding from the first region 131a and the second region 131b by a first width difference Wd1 toward one side in the second direction D2 and a portion protruding by a second width difference Wd2 toward the opposite side of the second region D2. The first width difference Wd1 and the second width difference Wd2 may be the same. That is, the third region 131c may include portions of the same size protruding toward both sides in the second direction D2.

According to an embodiment, the first width difference Wd1 and the second width difference Wd2 may be different from each other. Alternatively, any one of the first width difference Wd1 and the second width difference Wd2 may be 0 so that the third region does not protrude from the first region and the second region. That is, the third region 131c may include portions of different sizes protruding toward both sides in the second direction D2, or one portion protruding toward one side in the second direction D2.

As shown in FIG. 3, on a side surface, the first region 131a and the second region 131b may have a first thickness TH1 in a third direction D3 and the third region 131c may have a second thickness TH2 in the third direction D3. The third direction D3 is a direction perpendicular to the first direction D1 and the second direction D2, and the side surface means a side surface formed by the first direction D1 and the third direction D3 or a side surface formed by the direction D2 and the third direction D3. The second thickness TH2 may be smaller than the first thickness TH1. That is, the third region 131c may be thinner than the first region 131a and the second region 131b in the third direction D3.

The third region 131c may be formed to be thinner than the first region 131a and the second region 131b by a first thickness difference THd1 to one side in the third direction D3 and by a second thickness difference THd2 to the opposite side to the third direction D3. The first thickness difference THd1 and the second thickness difference THd2 may be the same. That is, the third region 131c may be concavely formed in upper and lower sides of the third direction D3 to have a thickness smaller than the first region 131a and the second region 131b.

According to an embodiment, the first thickness difference THd1 and the second thickness difference THd2 may be different from each other. Alternatively, any one of the first thickness difference THd1 and the second thickness difference THd2 may be 0. That is, the third region 131c may be concavely formed in the upper and lower sides of the third direction D3 at different depths, or may be concavely formed in the upper or lower side of the third direction D3.

The film portion 135 may be attached to upper and lower surfaces of the third region 131c of the conductive metal portion 131 to increase a degree of sealing of the case 120. When the first case 121 and the second case 126 are bonded to each other, the film portion 135 may overlap a sealing portion of the case 120 to increase the degree of sealing of the case 120.

As described above, a thickness of the entire third region 131c overlapping the sealing portion of the case 120 in the lead 130 may be formed to be thinner than a thickness of the first region 131a or the second region 131b and a width of the third region 131c may be formed to be wider than a width of the first region 131a or the second region 131b, thereby providing the lead 130 having a thin thickness which may be used for the thin secondary battery 10 by forming the lead 130 of a small thickness available in the rechargeable battery 10 of a small thickness, and the thickness of the lead 130 may be reduced, thereby reducing resistance of the lead 130 without increasing the resistance of the lead 130, and preventing a sealing failure of the case 120 that may be caused by the lead 130.

Hereinafter, a lead having a shape different from that of the lead 130 of FIG. 2 on a plane will be described referring to FIGS. 4 and 5. The difference between FIGS. 4 and 5 and FIG. 2 will be mainly described.

Figure 4:
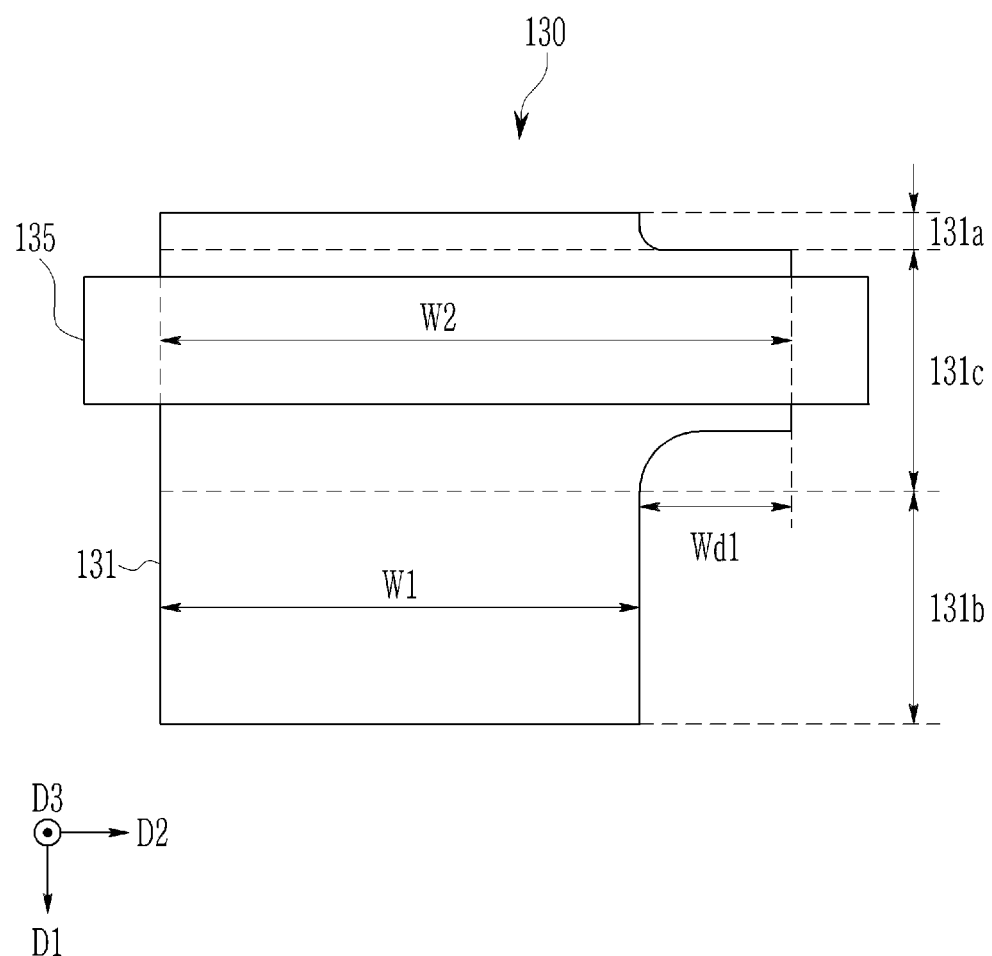
FIG. 4 is a plan view showing another exemplary embodiment of a plane structure of a lead.

FIG. 4 is a plan view showing another embodiment of a plane structure of the lead 130.

Upon comparing FIG. 4 with FIG. 2, the second width difference Wd2 (see FIG. 2) may be 0 in the lead 130 of FIG. 4, and the first width difference Wd1 may be further increased. That is, in the conductive metal portion 131 of the lead 130, the third region 131c may include a portion protruding from the first region 131a and the second region 131b by the first width difference Wd1 toward one side of the second direction D2 and may not include a portion protruding toward the opposite side of the second direction D2.

Except for the differences, all the features described in the embodiment of FIG. 2 may be applied to the embodiment of FIG. 4, and thus redundant descriptions between the embodiments are omitted.

FIG. 5 is a plan view showing another exemplary embodiment of a plane structure of the lead 130.

Upon comparing FIG. 5 with FIG. 2, in the lead 130 of FIG. 5, the first width difference Wd1 (see FIG. 2) may be 0, and the second width difference Wd2 may be further increased. That is, in the conductive metal portion 131 of the lead 130, the third region 131c may include a portion protruding from the first region 131a and the second region 131b by the second width difference Wd2 toward the opposite side of the second direction D2 and may not include a portion protruding toward one side of the second direction D2.

Except for the differences, all the features described in the embodiment of FIG. 2 may be applied to the embodiment of FIG. 5, and thus redundant descriptions between the embodiments are omitted.

Hereinafter, the lead 130 having a shape different from that of the lead 130 of FIG. 3 on a side surface will be described with reference to FIGS. 6 and 7. The difference between FIGS. 6 and 7 and FIG. 3 will be mainly described.

Figure 6:
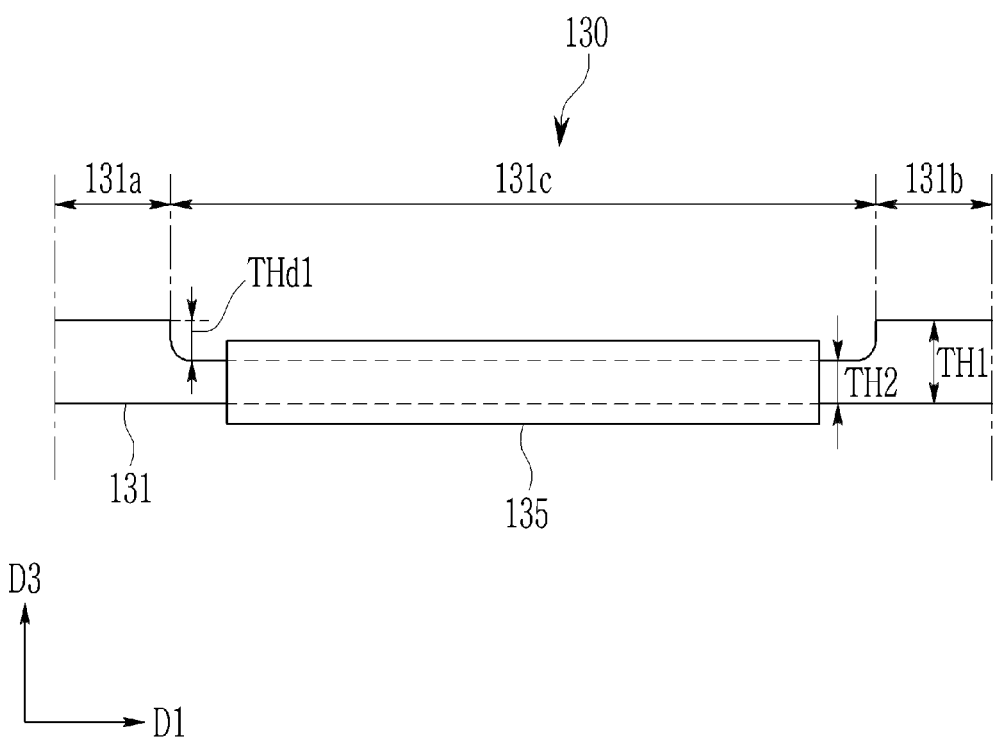
FIG. 6 is a side view showing another exemplary embodiment of a side surface structure of a lead.

FIG. 6 is a side view showing another exemplary embodiment of a side surface structure of the lead 130.

Upon comparing FIG. 6 with FIG. 3, in the lead 130 of FIG. 6, the second thickness difference THd2 (see FIG. 3) may be 0, and the first thickness difference THd1 may be further increased. That is, in the conductive metal portion 131 of the lead 130, the third region 131c may be formed to be thinner from the first region 131a and the second region 131b by the first thickness difference THd1 in one side of the third direction D3 and may be formed to be flat to form one plane of the first region 131a, the second region 131b and the third region 131c in the opposite side of the third direction D3. That is, the third region 131c of the conductive metal portion 131 may be concavely formed in an upper side. The side surface structure of the lead 130 in FIG. 6 may be applied to the plane structure of the lead 130 in FIGS. 2, 4 and 5.

Except for the differences, all the features described in the embodiment of FIG. 3 may be applied to the embodiment of FIG. 6, and thus redundant descriptions between the embodiments are omitted.

Figure 7:
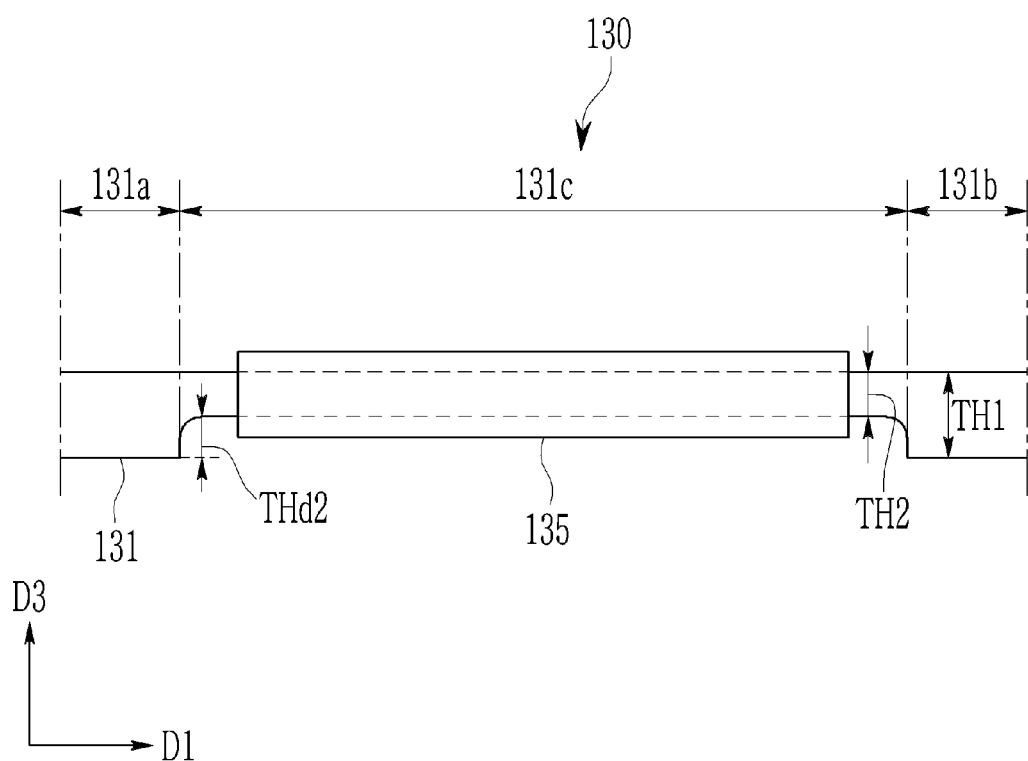
FIG. 7 is a side view showing another exemplary embodiment of a side surface structure of a lead.

FIG. 7 is a side view showing another exemplary embodiment of a side surface structure of the lead 130.

Upon comparing FIG. 7 with FIG. 3, in the lead 130 of FIG. 7, the first thickness difference THd1 (see FIG. 3) may be 0, and the second thickness difference THd2 may be further increased. That is, in the conductive metal portion 131 of the lead 130, the third region 131c may be formed to be thinner from the first region 131a and the second region 131b by the second thickness difference THd2 in the opposite side of the third direction D3 and may be formed to be flat to form one plane of the first region 131a, the second region 131b and the third region 131c in one side of the third direction D3. That is, the third region 131c of the conductive metal portion 131 may be concavely formed in a lower side. The side surface structure of the lead 130 in FIG. 7 may be applied to the plane structure of the lead 130 in FIGS. 2, 4 and 5.

Except for the differences, all the features described in the embodiment of FIG. 3 may be applied to the embodiment of FIG. 7, and thus redundant descriptions between the embodiments are omitted.

It is to be understood that the referred drawings above and the described detailed description of the invention are merely illustrative ones of the present invention, and these are used to explain the present invention only but are not intended to limit the meaning or the scope of the claims of the present invention. Therefore, those skilled in the art will appreciate that various modifications and equivalent embodiments are possible without departing from the scope of the present invention. Accordingly, the true technical protection scope of the present invention should be determined by the technical idea of the appended claims.

DESCRIPTION OF SYMBOLS

10: rechargeable battery
110: electrode assembly
120: case
130: lead

The invention claimed is:

1. A rechargeable battery comprising:
an electrode assembly;
a case including a sealing portion surrounding the electrode assembly; and
a lead electrically connected to the electrode assembly and extending in a first direction, the lead including a conductive metal portion and a film portion, the conductive metal portion being one monolithic conductor,
wherein the conductive metal portion of the lead includes:
a first region in contact with the electrode assembly and located inside the case;
a second region exposed to an outside of the case; and
a third region located between the first region and the second region and overlapping the sealing portion of the case,
wherein the third region has a width greater than that of the first region and the second region in a second direction, and a thickness of the entire third region is smaller than thicknesses of the first region and the second region in a third direction,
wherein the second direction is perpendicular to the first direction, and the third direction is perpendicular to the first direction and the second direction, and
wherein the film portion and the sealing portion of the case overlap the third region, and do not overlap with the first region and the second region and are spaced apart from a first boundary between the first region and the third region and a second boundary between the second region and the third region, respectively.

2. The rechargeable battery of claim 1, wherein:
the third region includes a first portion protruding past the first region and the second region toward one side of the lead in the second direction.

3. The rechargeable battery of claim 2, wherein:
the third region further includes a second portion protruding past the first region and the second region toward an opposite side of the lead in the second direction.

4. The rechargeable battery of claim 3, wherein:
the first portion of the third region protrudes by a first width difference relative to both the first region and the second region,
the second portion of the third region protrudes by a second width difference relative to both the first region and the second region, and
the first width difference and the second width difference are the same.

5. The rechargeable battery of claim 3, wherein:
the first portion of the third region protrudes by a first width difference relative to both the first region and the second region,
the second portion of the third region protrudes by a second width difference relative to both the first region and the second region, and
the first width difference and the second width difference are different from each other.

6. The rechargeable battery of claim 2, wherein:
the third region does not protrude past the first region and the second region at an opposite side of the lead in the second direction.

7. The rechargeable battery of claim 1, wherein:
the case is an aluminum laminate structure of a resin layer, a metal layer, and another resin layer, and
the film portion of the lead is attached to upper and lower surfaces of the third region.

8. The rechargeable battery of claim 1, wherein:
the film portion is attached to upper and lower surfaces of the third region of the conductive metal portion so that a thickness of the lead at the sealing portion of the case is substantially uniform in the third direction.

9. A rechargeable battery comprising:
an electrode assembly;
a case including a sealing portion surrounding the electrode assembly; and
a lead electrically connected to the electrode assembly and extending in a first direction,
wherein the lead includes:
a first region in contact with the electrode assembly and located inside the case;
a second region exposed to an outside of the case; and
a third region located between the first region and the second region and overlapping the sealing portion of the case,
wherein the third region has a width greater than that of the first region and the second region in a second direction, and a thickness of the entire third region is smaller than thicknesses of the first region and the second region in a third direction,
wherein the second direction is perpendicular to the first direction, and the third direction is perpendicular to the first direction and the second direction,
wherein the sealing portion of the case overlaps the third region, and does not overlap with the first region and the second region, and is spaced apart from a first boundary between the first region and the third region and a second boundary between the second region and the third region, respectively, and
wherein in a side of the lead in the third direction, surfaces of the first region, the second region, and the third region form a single uninterrupted plane.

10. The rechargeable battery of claim 9, wherein:
the third region includes a first portion protruding past the first region and the second region toward one side of the lead in the second direction.

11. The rechargeable battery of claim 10, wherein:
the third region further includes a second portion protruding past the first region and the second region toward an opposite side of the lead in the second direction.

12. The rechargeable battery of claim 11, wherein:
the first portion of the third region protrudes by a first width difference relative to both the first region and the second region,
the second portion of the third region protrudes by a second width difference relative to both the first region and the second region, and
the first width difference and the second width difference are the same.

13. The rechargeable battery of claim 11, wherein:
the first portion of the third region protrudes by a first width difference relative to both the first region and the second region,
the second portion of the third region protrudes by a second width difference relative to both the first region and the second region, and
the first width difference and the second width difference are different from each other.

14. The rechargeable battery of claim 10, wherein:
the third region does not protrude past the first region and the second region at an opposite side of the lead in the second direction.

15. The rechargeable battery of claim 9, wherein:
the case is an aluminum laminate structure of a resin layer, a metal layer, and another resin layer, and
a film portion of the lead is attached to upper and lower surfaces of the third region.

* * * * *